Figures 1, 2:
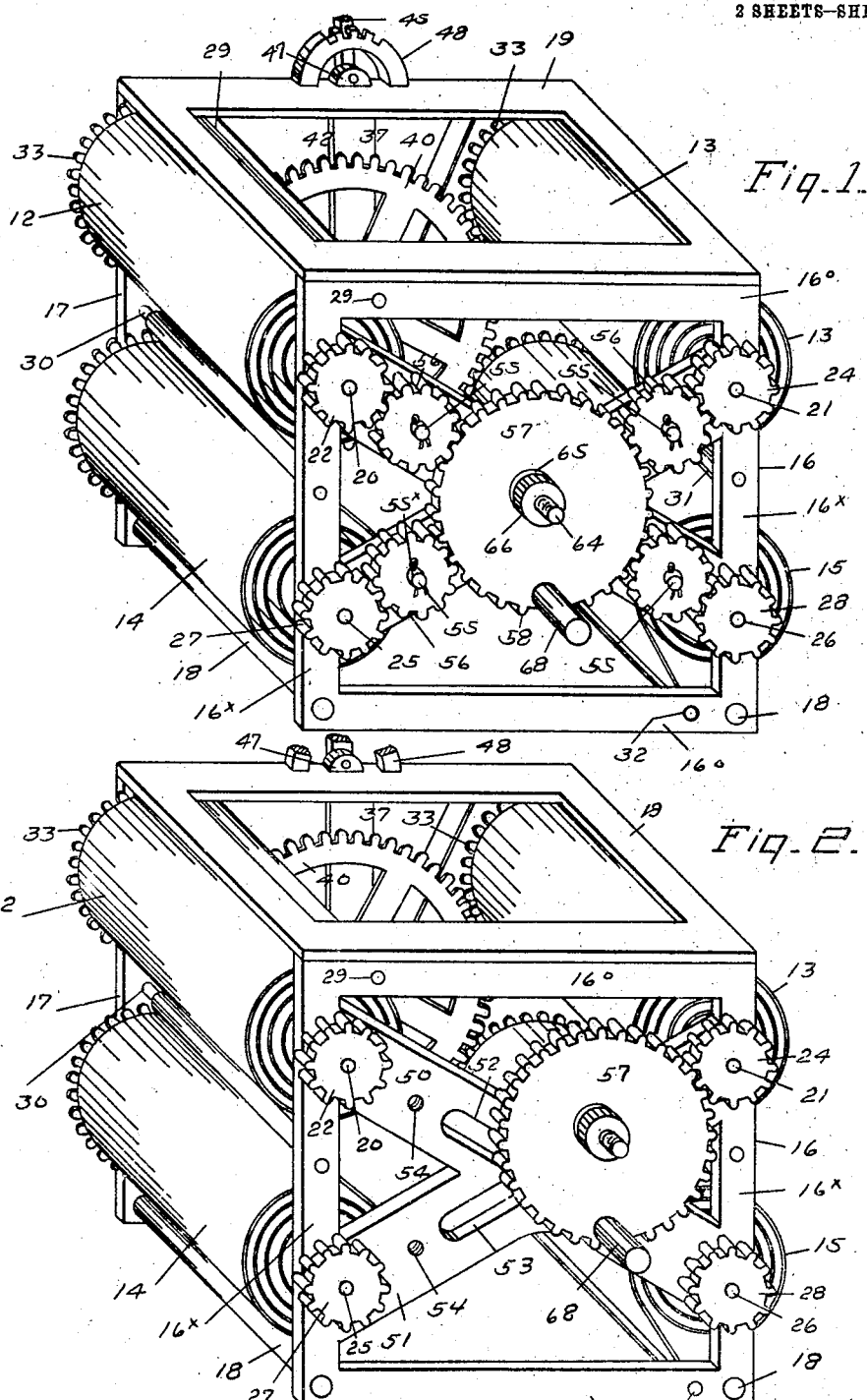

E. WILLIAMS.
SPRING WINDING AND CONTROLLING MECHANISM.
APPLICATION FILED AUG. 9, 1911.

1,042,064.

Patented Oct. 22, 1912.
2 SHEETS—SHEET 1.

Witnesses
C. L. Brown
J. F. Swarens

Inventor
Elliott Williams
By Rich & Manning
Attorney

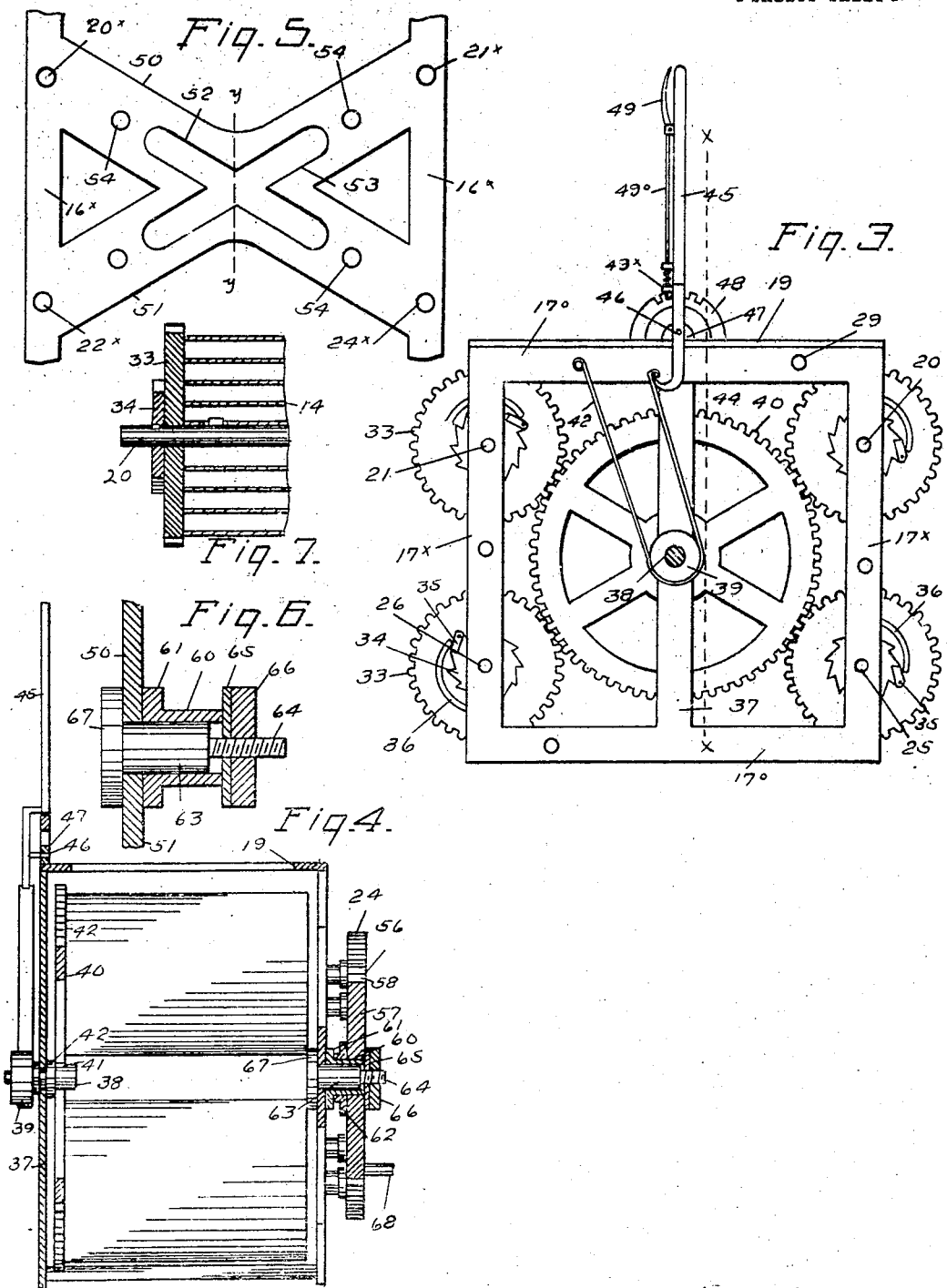

UNITED STATES PATENT OFFICE.

ELLIOTT WILLIAMS, OF KANSAS CITY, MISSOURI.

SPRING WINDING AND CONTROLLING MECHANISM.

1,042,064.　　　　　Specification of Letters Patent.　　Patented Oct. 22, 1912.

Application filed August 9, 1911. Serial No. 643,245.

*To all whom it may concern:*

Be it known that I, ELLIOTT WILLIAMS, a citizen of the United States of America, residing at Kansas City, in the county of Jackson and State of Missouri, have invented certain new and useful Improvements in Spring Winding and Controlling Mechanism; and I do hereby declare that the following is a full, clear, and exact description of the invention, such as will enable others to make and use the same, reference being had to the accompanying drawings, forming a part of this specification.

The objects of my invention are: First. The storing of energy in motor or clock springs, with a minimum expenditure of manual power. Second. To wind the springs in spring-operated motors or clocks either singly or in multiple with uniformity and with applied power approximate to the strength of the springs. Third. To wind clock or other springs with speed hitherto unobtained; and Fourth. The control of the expenditure of the energy stored in the winding spring of spring motors.

The invention consists in the novel construction and combination of parts, such as will be first fully described, and then specifically pointed out in the claims.

In the drawings: Figure 1. is an isometric view from the forward end of a spring motor, embodying the invention. Fig. 2. is a similar view to that seen in Fig. 1, showing the multiple idlers removed, and the power wheel in position for winding a single spring. Fig. 3. is a view in elevation of the rear end of the motor. Fig. 4 is a longitudinal, vertical, sectional view, taken on line $x, x$, on Fig. 3. Fig. 5. is a detail view of portions of the front end of the frame of the motor, showing the stud shaft and slide ways. Fig. 6. is a vertical, sectional view, taken in line $y, y$, on Fig. 5, showing the adjustable stud shaft in section. Fig. 7. is a detail, sectional view of one of the gear wheels on the winding spindle, showing the ratchet and pawls, and a portion of the spring.

Similar numerals of reference indicate corresponding parts in all the figures of the drawings.

The spring power of the motor, as seen in the drawings, to which reference is made, is embodied in four coiled springs 12, 13, 14 and 15, of corresponding length and power. These springs are supported by and arranged in position between two vertical frames 16 and 17, rectangular in form and spaced apart the requisite distance, the frame 16 forming the front end of the motor frame, and the frame 17 the rear end of the motor frame. The vertical sides $16^x$ and horizontal top and bottom portions $16°$, of the frame 16, and the like parts $17^x$ and $17°$, of frame 17, are as shown flat plates, narrow in width. The lower portions of the front and rear frames 16 and 17 are connected rigidly by the horizontal rods 18, the ends of which rods extend through the lower corners of the frames 16 and 17 are connected rigidly by the horizontal rods 18, the ends of which rods extend through the lower corners of the frame formed by the junction of the vertical side plates $16^x$ and $17^x$, and the lower plates $16°$, $16^x$, of the front and rear frames 16 and 17, respectively. The upper portions of the frames 16 and 17 are connected firmly together by the rectangular frame 19, the ends of which frame extend horizontally from the upper surface of the upper plate $16°$, of the frame 16, to the upper surface of the upper plate $17°$, of frame 17.

20 and 21 indicate the winding arbor or spindles for the upper, coiled springs 12 and 13 respectively, the rear ends of which spindles are journaled in the vertical plate $17^x$, of frame 17, a considerable distance downwardly from the line of the upper, horizontal plate $17°$. The forward ends of the spindles 20 and 21 extend through the opening $20^x$ and $21^x$, in the vertical plates $16^x$, of the front frame 16, and a short distance beyond the line of the forward surfaces of said plates, and upon the end of said spindles are fixedly secured the pinions 22 and 24, respectively.

25 and 26 indicate the lower, winding spindles for the lower, coiled springs 14 and 15, respectively, the rear ends of which spindles are journaled in the vertical side plates $17^x$, of the rear frame 17, in vertical lines with the respective spindles 20 and 21, and at points upwardly from the lines of the lower plate $17°$ corresponding to the distance of spindles 25 and 26, from the lines of the plate $17°$, of frame 17. The forward ends of spindles 25 and 26 also extend through the openings $22^x$, $24^x$, in the plates $16^x$, of front frame 16, to the same extent as spindles 20 and 21, and upon the said forward ends of spindles 25 and 26 are fixedly secured the pinions 27 and 28, respectively. The coiled spring 12 is secured in the usual manner at the inner end fixedly to winding spindle or arbor 20, its free end being extended upwardly and folded over the rod 29, the ends of which rod extend through the upper plates 16°, 17°, of the front and rear frames 16 and 17, above the lines of spring 12, and the free end of the coiled spring 14 is folded upon the rod 30, above the fold of said spring, the ends of which rod extend through the vertical plate 16ˣ 17ˣ, of the front and rear frames. The free ends of springs 13 and 15 are extended downwardly, and folded upon the respective rods 31 and 32, below the folds of the springs, the ends of which rods extend through the vertical plates 16ˣ, 17ˣ, and 16°, 17°, respectively, of frames 16 and 17.

Upon the inner end of each winding spindle a short distance inwardly from the lines of the inner surface of plates 17ˣ, of frame 17, is loosely mounted the cog wheel 33, and between said wheel and the said surfaces of plates 17ˣ, a ratchet wheel 34 is fixedly secured to each spindle. Upon the outer surface of each wheel 33 is pivoted a pawl 35, which engages with the ratchet wheel 34, said ratchet wheel being held in engagement by the spring plate 36, on the side of the wheel, its free end bearing on said pawl.

With the respective upper and lower, horizontal plates 17°, of frame 17, are rigidly connected at a point equidistant from the plates 17ˣ, a vertical plate or standard 37. In said standard, at a point intermediate its ends is journaled the inner end of a rotary power-transmitting shaft 38, its outer end extending outwardly beyond the outer surface of said standard, and upon said shaft is a band wheel 39. Upon the inner end of shaft 38, which extends inwardly a short distance from the line of the inner surface of standard 37, is keyed at 41, a large gear wheel 40, which rotates with said shaft and is in constant mesh with each cog-wheel 33, on each winding spindle 20, 21, 25 and 26.

The expenditure of power of one or more coiled springs through the large gear wheel 40 is controlled by a brake band 42, secured at 43, at one end, to the outer surface of the upper plate 17°, of frame 17, the other or free end passing beneath and in contact with the lower surface of band wheel 38, thence extended upwardly and secured to the hooked, lower end 44, of a brake operating lever 45. This lever 45 is provided at 46, in a boxing 47, on the upper surface of the top frame 19, and in a vertical line with the standard 37. Upon said frame 19, within the lever 45, is secured a notched segment plate 48. Upon lever 45 is a hand lever 49, and a spring-controlled detent 49ˣ, engaging with the notched segment plate 48, said detent and hand lever being connected by a wire 49° the lower end of the detent being extended at right angles inwardly, as seen in Fig. 4, to engage with the notches in the segment plate. The central portion of the front frame 16 is composed of two integrally-formed wide plates 50 and 51, crossing each other in lines diagonal to the frame (see Fig. 5). In the central portion of said plates 50 and 51 are slots 52 53, drawn upon the same lines as described of the plates 50 and 51, the slots intersecting with each other at the point where said lines cross each other, the outer ends of the slots extending a considerable distance in the direction of the respective spindles 20, 21, 25 and 26. In the cross plates 50 and 51, between the outer ends of the slots 52 and 53 and the spindles 20, 21, 25 and 26, are screw-threaded openings 54, in which are fitted the screw-threaded inner ends of the stud shafts 55. Upon these shafts 55 are mounted loosely the pinions or idlers 56, which are approximately of the same circumference as the pinions 22, 24, 27 and 28, and with which the pinions 56 are in mesh. These pinions are held on the shaft 55 by cotter pins 55ˣ.

57 indicates the power wheel for winding the springs of the motor. This wheel is large in circumference, and is made or cast to obtain great weight. Upon the circumference of the wheel 57 are cog teeth 58, which mesh with the respective idlers or pinions 56, on the stud shafts 55.

The power wheel is loosely mounted upon an adjustable bearing consisting of a sleeve 60, upon the inner end of which sleeve is a flange 61, which bears upon the outer surface of plates 50 and 51 and extends past the lines of the sides of slots 51 and 52. Upon the inner surface of the wheel 57 is a hub 62, which bears against the outer surface of flange 61. The sleeve 60 is mounted upon the outer end of a stud shaft 63, upon which outer end of said shaft is a reduced screw-threaded portion 64, upon which portion is a washer 65, and a clamping nut 66, which bears against washer 65, the latter bearing against the outer end of the sleeve 60. The inner end of the stud shaft extends within the slots 52 and 53, at their point of intersection, and upon the inner end of said shaft is a circular flange 67, which bears against the inner surface of the plates 50 and 51 and extends past the lines of the sides of the slots 52 and 53, the flanges 67, on the stud shaft 63, and the flange 61 on the sleeve 60, acting to clamp the opposite surfaces of the plates 50 and 51, and support the stud shaft in position, the sleeve being slightly longer than said shaft. Upon the outer surface of the power wheel 57, near the periphery, is an operating handle 68, which extends outwardly a short distance therefrom.

In the operation of winding the springs of the motor, which are shown in Figs. 1 and 2 expanded and ready to be wound, the brake lever 45 is first moved to the right and sufficient tension imparted to the brake band 42 to arrest motion of the gear wheel 40. Manual power is then applied to the handle 68, on the power wheel 57, and rotation imparted to said wheel in a right hand direction, communicating a reverse movement to the pinions 56, and a right hand movement to the pinions 22, 24, 27 and 28. This movement turns the respective spindles 20, 21 and 25 and 26, in the same direction, drawing expanded coils of the springs close together upon the said spindles, reverse movements of said spindles being prevented by the gear wheel 40, with which the gear wheels 33 are in mesh, the pawl 35 in the latter engaging with the ratchet wheels 34, in their rotation.

In the application of the power of the wheel 57, to the winding of the springs, the coils are wound with a uniform movement, and the tension of each spring is uniform, so that in the expenditure of power of the springs none are weakened or over-wound, and a greater efficiency is obtained from the springs in the aggregate. Furthermore, the winding of the springs is obtained with a quick movement, and in large clocks the winding of the springs is obtained with the expenditure of minimum amount of manual power. Whenever the winding of a single spring is desired, and sufficient power is obtainable from one instead of the springs in multiple, the pinions 56 and stud shafts 55, may be removed as seen in Fig. 2. The clamping nut 66, on the stud shaft 64, is then released thereby releasing the clamping action of flanges 61 and 67, on the sleeve 60, and stud shaft 63, and the stud shaft is moved in the line of the slots 52 or 53, and the power wheel 57 caused to mesh with one of the pinions on one of the winding spindles, or as seen in Fig. 2, with the pinion 24, on the winding shaft 21.

The distribution of the power, as is obvious, is from the shaft 38, controlled by the action of the lever 45. In its uses the storage of power is facilitated, so that ordinary spring motors may be given a larger field of usefulness.

Such other modifications may be employed as are within the scope of the appended claims.

Having fully described my invention, what I now claim as new and desire to secure by Letters Patent is:

1. In a spring motor the combination with the frame of the motor and with the winding coiled springs and arbors arranged apart from each other in the upper and lower portions of said frame and having the forward ends of said arbors extending through the forward end of said frame, of pinions on the said ends of said arbors, said frame having intersecting crossed slots in the forward end thereof extending in the direction of the respective upper and lower spindles, an adjustable stud shaft in said slots at the intersection thereof, means for controlling the unwinding of the coiled springs and a winding wheel on the stud shaft adapted to be moved into engagement with a pinion in line with the slots in the forward end of said frame and means for imparting a rotary movement to said winding wheel on the stud shaft.

2. In a spring motor the combination with the frame of the motor and with the winding coiled springs and arbors arranged apart from each other in the upper and lower portions of the frame and having the forward ends of said arbors extending through the forward end of said frame, of spring winding pinions on the said ends of the arbors, said frame having crossed bars at its forward end extending in the direction of the respective upper and lower arbors, slots in said bars extending diagonally to the frame and intersecting with each other an adjustable stud shaft within the said slots at the intersection thereof, means for controlling the unwinding of the springs and a spring winding gear wheel on said stud shaft adapted to be moved into engagement with the pinions on the arbors alternately and means for imparting rotary motion to said wheel.

ELLIOTT WILLIAMS.

Witnesses:
F. D. GLORE,
ANNIE L. GREER.